Nov. 30, 1926.
H. ASIO
1,609,101
MOTOR DRIVEN LAWN MOWER AND RAKE
Filed April 17, 1922
3 Sheets-Sheet 3

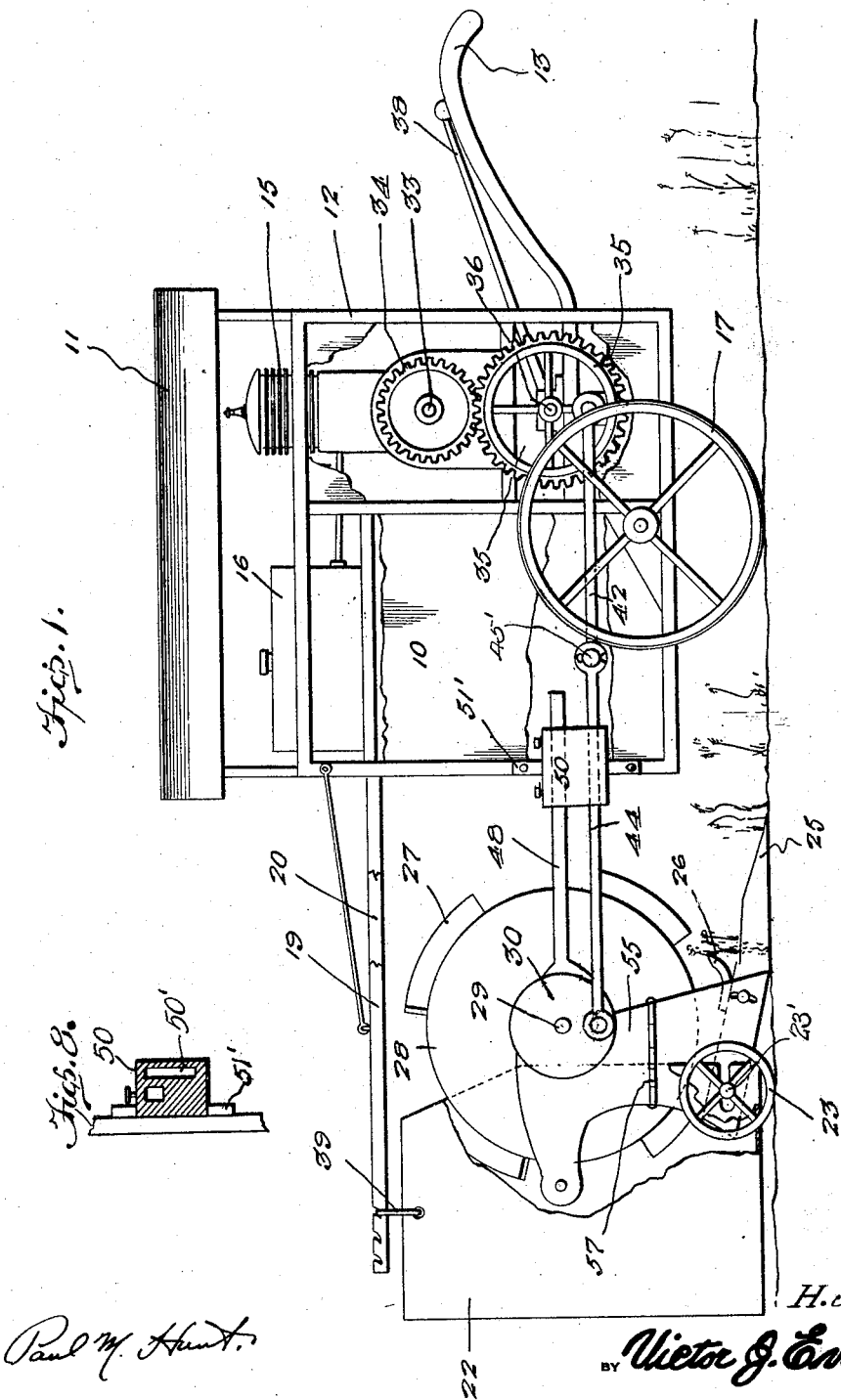

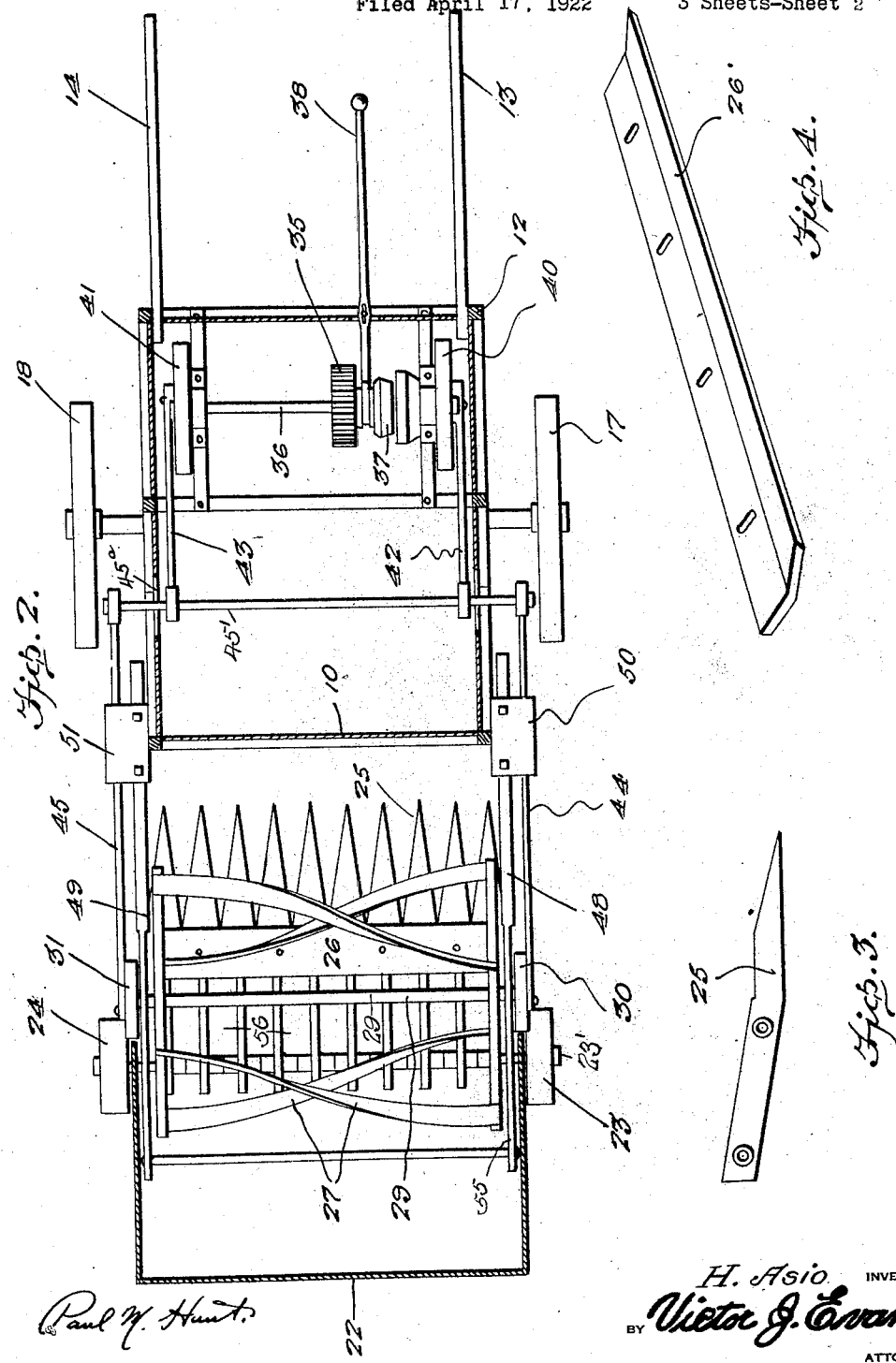

H. Asio INVENTOR

BY Victor J. Evans ATTORNEY

WITNESS:

Patented Nov. 30, 1926.

1,609,101

UNITED STATES PATENT OFFICE.

HERMENEGILDO ASIO, OF LOS ANGELES, CALIFORNIA.

MOTOR-DRIVEN LAWN MOWER AND RAKE.

Application filed April 17, 1922. Serial No. 553,745.

The object of this invention is to provide a machine for use on large lawns, and in parks, for raking and trimming the grass, the machine including a power driven rotary cutter, means for receiving the cut grass, and a toothed element serving as a rake.

A further object is to provide a particular form of drive between the crank shaft of the motor and the rotary cutting element, and clutch mechanism for discontinuing the drive when the rake alone is to be used, or when both the rake and cutter are elevated to inoperative position.

With the foregoing and other objects in view, the invention consists in the novel construction and arrangement of elements described and claimed, it being understood that modifications may be made within the scope of the claims without departing from the spirit of the invention.

Figure 6:
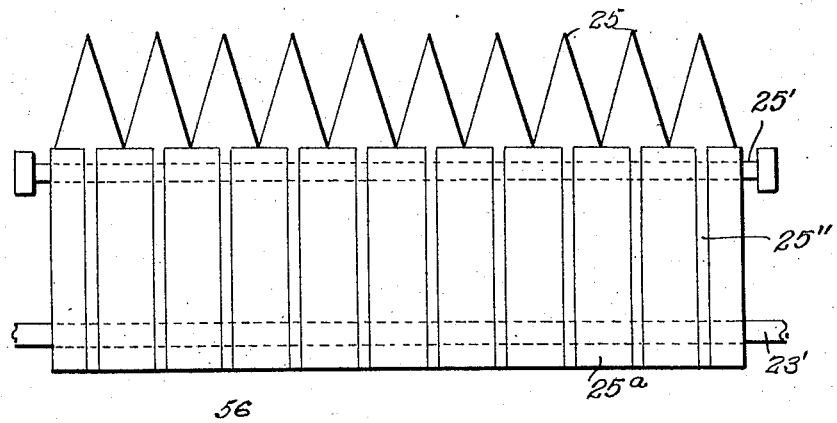
Figure 7:
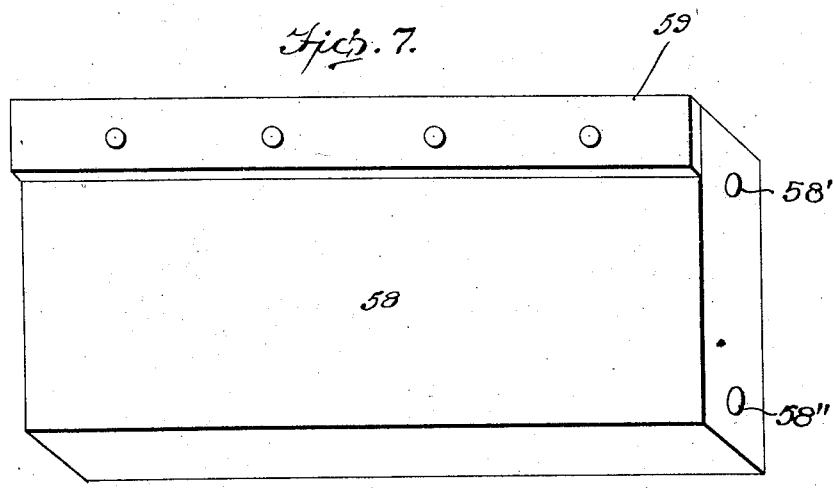
Figure 5:
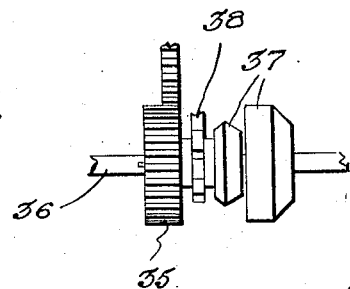

In the drawings, Figure 1 is a view of the machine in side elevation, parts being broken away; Figure 2 is a top plan view of the operative mechanism, the housing being shown in horizontal section; Figure 3 is an edge elevation of the rake; Figure 4 is a perspective view of a stationary cutter bar, slightly modified; Figure 5 is a detail view of the clutch mechanism; Figure 6 is a plan view of the rake, detached; Figure 7 is a perspective view of a block and stationary cutter bar which may be substituted for the rake and cutter bar or blade 26, when the rake is not needed. Figure 8 is a detail view showing bracket 50, of Figure 1, designed to retain arm 48 and guide pitman 44.

A housing 10 is provided with a top 11, and is constructed upon a framework 12, the latter carrying handles 13 and 14.

A gasoline motor 15 imparts movement to the driving mechanism, and a fuel tank is shown at 16. The housing including the main frame, is mounted on ground wheels 17 and 18 and extending rearwardly from the frame are spaced parallel bars 19 and 20 having their ends notched, as shown, and affording means for adjustably mounting the grass receptacle 22 supported between wheels 23 and 24.

A rake-carrying frame includes the side elements 55 of Figure 1, which are apertured, for axle 29 of a rotary cutter, for axle 23′, and for devices securing the detachable rake (Figure 6), to which is bolted stationary cutter bar 26 of Figure 1, or bar 26′ of Figure 4, for cooperation with blades 27 of the rotary cutting element 28.

This rotary cutter 28 is mounted on shaft 29 extending through the rake-carrying frame, and the shaft rigidly mounts crank wheels 30, 31 connected with pitmen 44, 45. These pitmen are pivotally connected with cross rod 45′ which is reciprocated longitudinally of the machine, operating in slots 45ª of the housing 10.

Mounted on shaft 36 are crank wheels 40, 41, imparting movement to pitmen 42, 43, transverse rod 45′ and pitmen rods 44, 45, and therefore to the rotary cutter. Clutch 37 on shaft 36 is controlled by lever 38.

Bars 48, 49 are longitudinally adjustable in sleeves or elements 50, 51, and support the rake-carrying frame. The sleeves also guide pitmen 44, 45 and are mounted on the frame 12 by brackets 51′. This adjustment permits of correct assembly by the purchaser.

Axle 23′ and wheels 23, 24 mount the rake-carrying frame 55, and rake holder 56 of Figures 2 and 6 is detachable (by removing wheel 23), because of the hinge connection 57 of Figure 1, permitting block 58 carrying knife 59 to be substituted for the rake when the latter is not required. Block 58 is provided with bores 58′ 58″ receiving rod 25′ and axle 23′ of Figure 6.

It should be added that the rake 25 includes teeth each having a shank 25″, the shanks being spaced by blocks 25ª through which axle 23′ and rod 25′ are adapted to pass, as indicated in dotted lines in Figure 6.

Receptacle 22 is supported by bail 39, on bars 19 and 20.

Having thus described my invention, I claim:

1. In a device of the class described, a main frame, bars extending from said frame, a grass receptacle and means for mounting the receptacle in various positions upon said bars and at a point spaced rearwardly from the main frame, a rotary cutter and a relatively stationary cutter positioned at the front of the grass receptacle, a rake mounted below said cutters, the cutters and rake being positioned between the grass receptacle and main frame, means for mounting the cutters, wheels supporting the cutter mounting means independently of the main frame, and means for imparting movement to the rotary cutter.

2. In a device of the class described, a main frame, bars extending from said frame, a grass receptacle and means for mounting the receptacle in various positions upon said bars and at a point spaced rearwardly from the main frame, a rotary cutter and a relatively stationary cutter positioned at the front of the grass receptacle, a rake mounted below said cutters, the cutters and rake being positioned between the grass receptacle and main frame, means for mounting the cutters, wheels supporting the cutter mounting means independently of the main frame, and means for imparting movement to the rotary cutter, said means last named including a transverse shaft operatively connected with the rotary cutter, and means for reciprocating the transverse shaft longitudinally of the machine, and of said main frame.

In testimony whereof I affix my signature.

HERMENEGILDO ASIO.